May 31, 1960 G. W. G. VAN WINKLE ET AL 2,938,686
AIRCRAFT ELECTRONIC EQUIPMENT ASSEMBLY
Filed Feb. 4, 1957 4 Sheets-Sheet 2

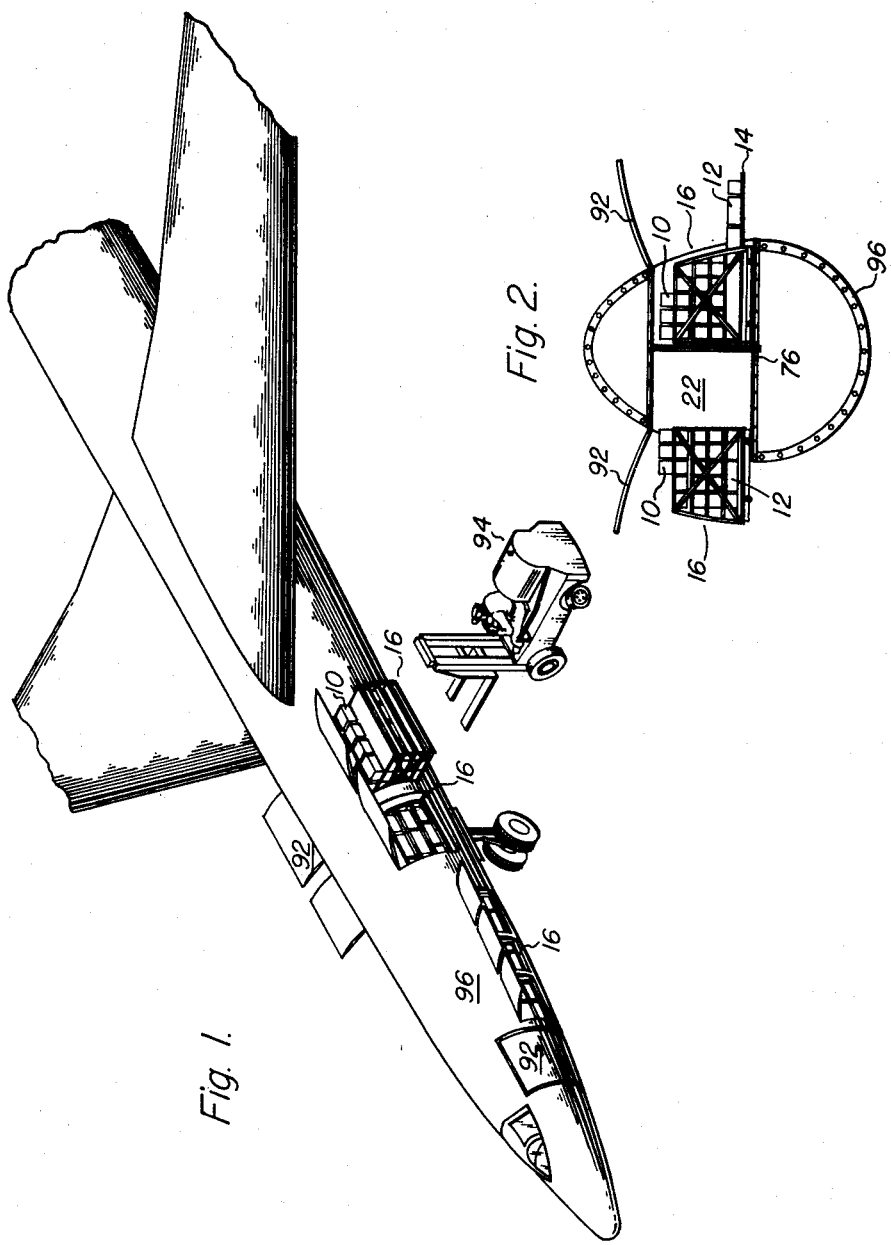

INVENTORS
George W. G. Van Winkle
Walter J. Lohstreter
Richard W. Van Wyhe

BY Duane C. Bowen
ATTORNEY

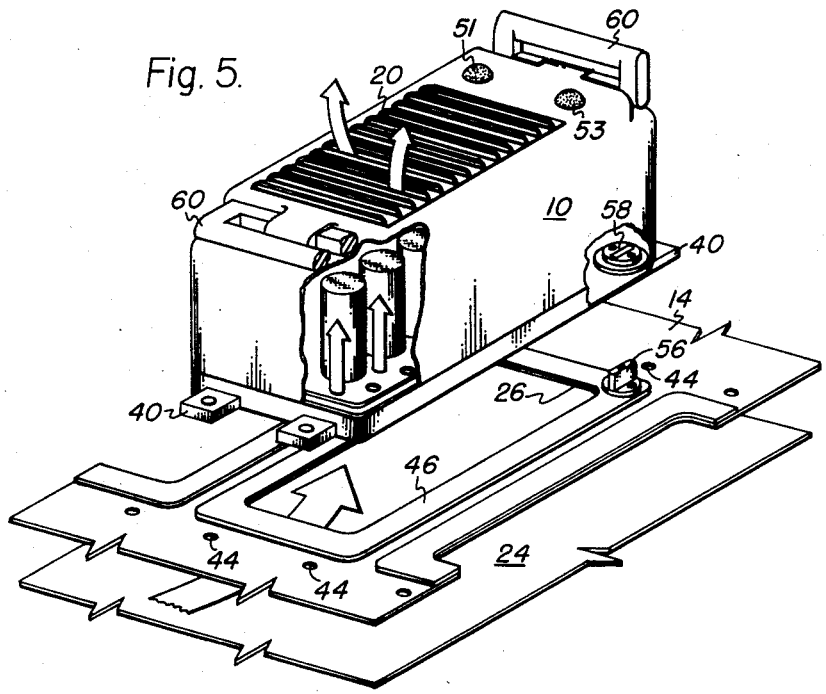

INVENTORS.
George W. G. Van Winkle
Walter J. Lohstreter
Richard W. Van Wyhe

BY Duane C. Bowen
ATTORNEY.

United States Patent Office 2,938,686
Patented May 31, 1960

2,938,686

AIRCRAFT ELECTRONIC EQUIPMENT ASSEMBLY

George W. G. Van Winkle and Richard W. Van Wyhe, Wichita, Kans., and Walter J. Lohstreter, Seattle, Wash., assignors to Boeing Airplane Company, Wichita, Kans., a corporation of Delaware Filed Feb. 4, 1957, Ser. No. 638,003

12 Claims. (Cl. 244—118)

Our invention relates to the assembly of electronic equipment in aircraft. More particularly, the structure includes novel shelved and banked supports for electronic equipment packages standardized in sizes and shapes. This and associated structure is designed for various objectives including maximum density, easier maintenance, adaptability for modification and accessibility from the exterior of the aircraft.

The object of past electronic equipment design in aircraft was to obtain a minimum total package size for a system or component. The resultant packages widely varied in sizes and shapes. This resulted in inefficient utilization of airframe space and many different types of supports. Some current planes require for each cubic foot of electronic equipment as much as five to eight cubic feet of airframe space. It is an objective of our invention to increase density and to standardize supports and package shapes and sizes adapted for use in most airframe configurations. The resulting density may be as high as about one cubic foot of electronic equipment per 2.3 cubic feet of airplane space.

Many airplanes are subject to substantial modification after initial production but commonly insufficient provision is made to facilitate change of electronic equipment. If density is increased, then modification becomes more difficult. It is a further objective of our invention to achieve maximum density while making provisions including standardized package sizes, shapes and supports to facilitate a substantial modification program.

Advanced aircraft commonly demand reduced frontal area and fuselage size. Space available for electronic equipment consequently is reduced. At the same time more equipment must be installed due to increase in electrical systems and their complexity. Two principal approaches to solve the problem are (1) miniaturization and (2) increasing density. It is an objective of our invention to approach the problem from the latter method to achieve maximum concentration consistent with factors such as accessibility for maintenance, adaptability for modification and avoidance of drastic modification of present electronic units, e.g., selection of a basic package size which is compatible to the shapes and sizes of existing electronic components.

Increased concentration of equipment responsive to reduced fuselage size and to more electronic components results necessarily in increased heat concentration. Heating is further aggravated by increased speeds of aircraft. Energy required for cooling significantly affects the airplane power and weight. It is an objective of our invention to design an electronic assembly with maximum cooling efficiency consistent with other objectives. To achieve this, it is an objective to directly cool all electronic systems in any one airframe from a central source.

Further objectives include: to provide access directly to the exterior in most installations so that space in the airframe is not needed for access of maintenance personnel and for clearance room for components; to adapt the components and supports for rapid and efficient assembly, maintenance and replacement; to achieve the above objectives while making minimum demands on electronic manufacturers for modification of existing designs; and to meet the objectives with due regard for economy, weight, reliability, shock mounting and efficiency of operation.

Our invention will be best understood, together with additional advantages and objectives thereof, from a reading of the following description, read with reference to the drawings, in which:

Figure 1 is a perspective view of a portion of an aircraft having a specific embodiment of our invention incorporated therein and of a fork truck for carrying electronic assemblies;

Figure 2 is a sectional view taken on a vertical plane passing transversely through the fuselage;

Figure 5 is an enlarged perspective showing portions of an electronic package and its supporting shelf;

Figure 6 is a vertical sectional view showing portions of a shelf, a large electronic package and a coolant supply passageway, and showing in dotted lines the orientation of two small packages in the space occupied by the large package;

Figure 3:
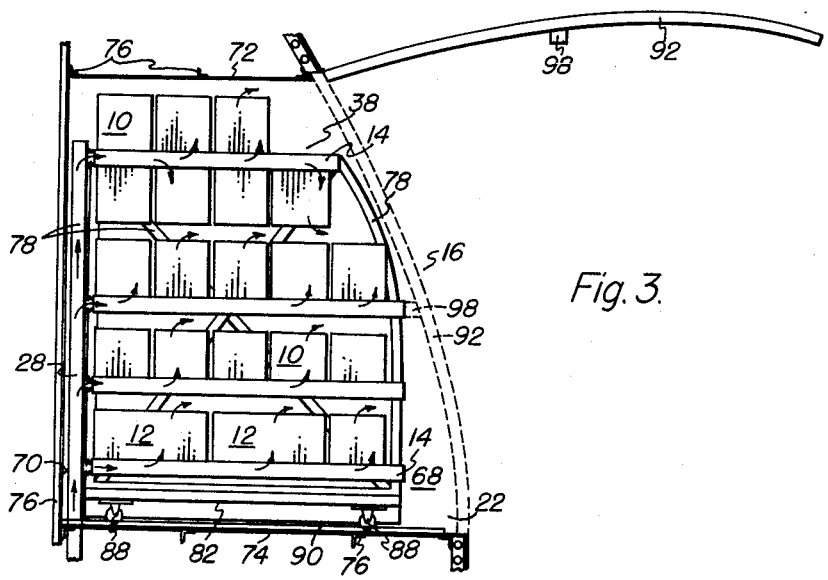
Figure 3 is an enlarged side elevation of a bank of electronic equipment and portions of the surrounding airframe.

The term "aircraft" is defined as including various craft, propelled above the surface of the earth in the atmosphere and in space, for purposes of the claims and whenever appropriate in the specification.

To review certain objectives, they include:
(1) To increase density.
(2) To maximize cooling efficiency.
(3) To facilitate service and modification.
(4) To provide weight reduction.

The last factor of weight is important and the present invention makes an improvement therein. However, in the total environment of the problem, other factors sometimes override the ever present desirability of weight saving in aircraft design. Weight is increased by the banked, telescopic support structure, compared with prior more simple individual supports of various electronic components. However, weight is decreased by increased density requiring less airframe and a small net weight savings may result.

Considering the first factor of density, a considerable study indicates that a basic envelope can be established of a volume and shape adaptable for packaging of most equipment. By the use of this envelope as a basic package, volume of electronic equipment in a given airframe can be increased as much as 2.6 times that obtained in present aircraft. Study has shown that most major systems can be broken into functional packages without unreasonable comprise to the circuitry.

The most practical basic envelope volume has been established as being approximately one quarter cubic foot. Good results have been obtained with a width-height-depth of approximately 6" x 6" x 12" or a ratio of 1:1:2. One configuration used a size of 6" x 8" x 8" advantageously. It is desirable that an industrial standard be reached for this basic package.

Limited use of package sizes other than basic envelopes does not substantially affect density, provided that most of the odd shaped packages have dimensions of width, height and depth either equal to or multiples of the basic envelope.

Turning to the second factor, standardized cooling is closely related to standardized packaging. To obtain needed efficiency, the standardized equipment should be all cooled in the same manner from the same primary source. In the drawings, air is indicated as the cooling medium and the structure shows adaptability for other types of cooling media.

Referring to the third factor, the drawings show a supporting structure adapted for removal and replacement including the removal of one package, one shelf or a complete band. Electrical and cooling connections are of a quick disconnect type.

Some equipment cannot be packaged as shown. These exceptions will be in the minority and much is to be gained by applying the design disclosed to the majority of equipment.

Certain assumptions are made as to future aircraft which facilitate this electronic assembly if some or all are correct:

(1) Airframes will include comparatively large size compartments for exclusive installation of electrical equipment. However, packages must be adapted for random installation.

(2) Inflight maintenance of the equipment will not be required.

(3) Most equipment will be operable in any position.

(4) Shock mounting can be accomplished by a common shock mounting of banks of electronic equipment and by supplemental internal shock mounting of particularly sensitive units.

(5) Many units or systems can have simple test indication such as "Go" or "No-Go." The malfunctioning equipment will be thus detected and equipment replaced. Repair will commonly be done at centers on the field or elsewhere and not on the plane.

(6) For faster ground maintenance, most mechanical fasteners, electrical connectors, air supply connectors and the like can be of a quick disconnect type.

To establish package sizes and other details, a considerable study was made including extensive work with installation layouts and by plotting package sizes relative weight and density ratios. Mathematical and statistical studies were made and other approaches were compared. Available electronic equipment sizes were studied, data was obtained on equipment weight and wattage dissipation, and models were made of certain structure. Significant portions of this study will be reviewed herein.

Figure 8:
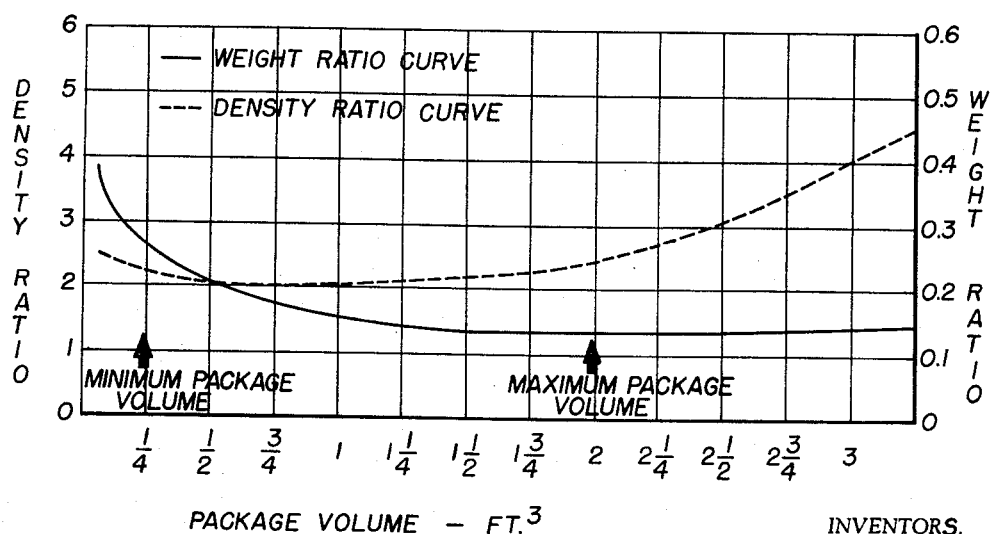
Figure 8 is a graph relating density to the cubical size of the packages.

Figure 8 is a graph relating density ratio achieved to the volume of the standardized package. The package volume is defined as the size of the standardized package, as 10, which contains the electronic equipment. Package 12 is double the volume of package 10. Package 10 is the standard package because the majority of packages normally have that size and because the remainder have dimensions of width, depth or height which are multiples of that appearing in package 10. When the expression "multiple" is used herein, the term means a multiplication in volume or dimension by one or more.

The density ratio is defined as the ratio of airframe space occupied to the total volume of packages such as 10 and 12 contained therein. Figure 8 indicates that the minimum package volume, to best achieve the results desired, should be approximately one quarter cubic foot and the maximum should be approximately two cubic feet. The package on the minimum side of the range, e.g., approximately one quarter cubic foot, is desirable from several respects including a high density ratio and a moderate weight ratio.

Weight ratio is defined as the ratio of supporting structure weight (other than normal airframe structure) to the equipment weight packaged in containers such as 10 and 12 (including the weight of container). The weight ratio is quite poor when the package height is small. This is a result of the large number of shelves required in the bank. The weight ratio generally improves with increasing package height. However, a point is reached where space available in the compartment is insufficient vertically to install another row of packages. This point is a function of the compartment size and contour, but for any configuration more space is usable as the package height increases beyond some limit.

A study was made of the average weight of electronic equipment packaged in containers such as 10 or 12 and an average figure was computed as 40 pounds per cubical foot of container space. The average wattage dissipation was computed as 400 watts per cubical foot of container space as a result of an investigation of typical systems.

Packages 10, 12 are mounted on shelves 14 which are generally superposed in banks 16 and are preferably horizontally disposed. Shelves 14 are supported by telescoping tracks 18. Layouts of a typical bank showed that tracks 18 accounted for approximately 60% of the total package supporting weight in the structure of each bank. Particularly in small banks, it may be desirable in certain installations to have a less complex non-telescoping detachable support for shelves 14, as the bank as a whole is removable, and less rapidly demountable shelves could be handled in a central maintenance facility.

Access to the packages on each shelf 14 is obtained by moving the shelf on telescoping track 18 to a position outside of its normal position in the bank. This type of rack or bank construction achieves accelerated ground maintenance. Further, the usable area of the compartment increases because it is not necessary to leave space vacant for removal clearance of packages.

Forced cooling air is piped to the individual packages through an integrated duct system built into the bank structure. Air is exhausted through louvers 20 into compartment 22. Shelves 14 are hollow, forming a duct 24 from which air passes into packages 10, 12 by openings 26. A common distribution duct 28 is provided for shelves 14 having an egress opening 30 for each shelf. A simple quick release connection is provided by a compression bellows fitting 32 of resilient materials formed about a helical compression spring. This is secured to a fitting 34 on shelf 14 and compresses against the wall of duct 28 about opening 30 to make a sealed connection when shelf 14 is in its inner position. A single central source of forced cooling air can be provided for all ducts 28 within an airframe and maximum cooling efficiency will be obtained. A valve 36 is provided for air discharge from compartment 22 and the heated air can be discharged into other portions of the aircraft or overboard. With electronic tubes requiring certain minimum external pressure to avoid breakage due to differential pressure, valve 36 is a pressure regulator permitting escape of air only when in excess of selected minimum pressure.

Two methods of mounting packages on shelves 14 are used. The common system is to mount packages 10, 12 on top of the shelves, but in Figures 3 and 4 double top and bottom mounting is shown at 38. The latter method is feasible on occasion but is limited in use for equipment which requires a single orientation for normal operation. A sway clearance of one inch for each twelve inches of package height is desirable. Quick action securing of packages 10, 12 is desirable and is shown as taking the form of corner lugs 40 and wing headed screws 42 threading into openings 44.

Figure 4:
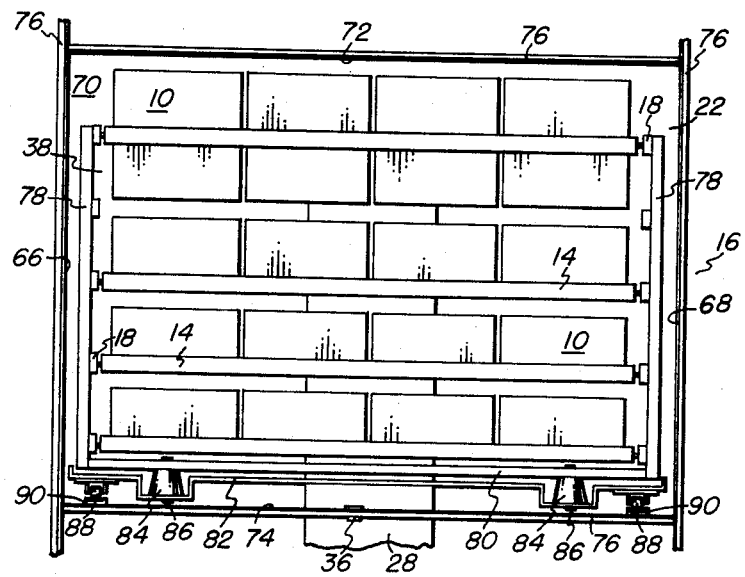
Figure 4 is a view similar to Figure 3 only viewing the bank from its front.

As will be noted from Figures 3 to 6, the mounting is adapted for the substitution of packages, as 12, which are multiples of the standard package 10 in some dimensions. This is an important feature because adaptability for a substantial modification program is a basic objective of the invention. Figure 6 shows the substitution of two standard packages 10 for a double sized package 12 and Figure 3 shows two rows of packages 12.

A gasket 46 is shown in Figure 5 between the edges of container 10 and the margins of opening 26 to seal against air leakage when this is needed.

Figure 7:
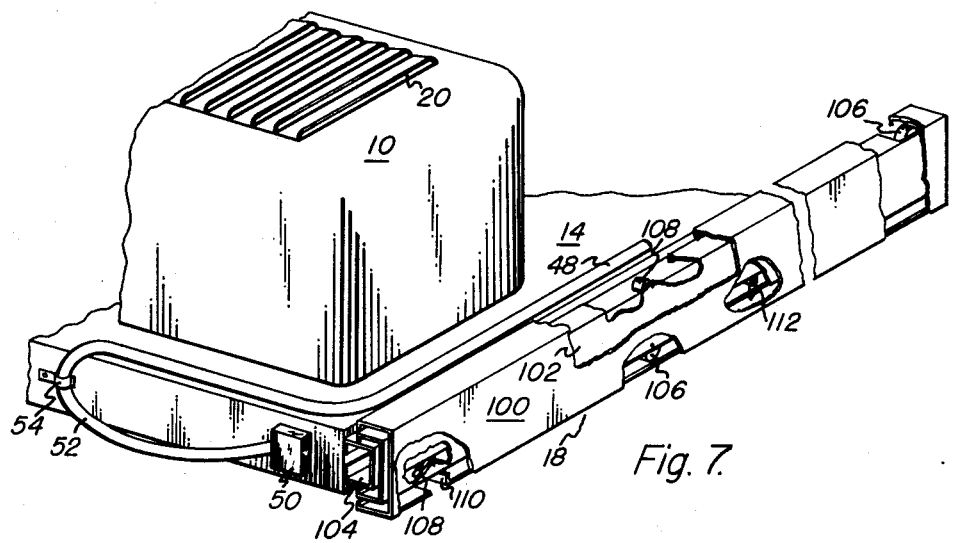
Figure 7 is a perspective view of portions of a shelf and telescopic support.

Figure 7 shows a cable 48 for electrical connection having a quick disconnect plug 50. Sufficient cable is provided to continue electrical connection when the shelf is brought to its outer position and the extra length is formed in a bight 52 releasably secured by spring clip 54 as shown in Figure 7. Electrical connectors from plug 50 and between containers 10 are not shown and will vary between the electrical units supplied. The units on one shelf or on more than one shelf may be all components of a single system. Connection between units will preferably be of a quick disconnect type. Simple test devices may be used to indicate defective units, such as "Go," "No-Go" signal lights 51, 53. It is contemplated that defective units will be replaced and the removed units repaired in a central facility. The adaptability of the electronic assembly for this component substitution means that the aircraft may have less time disabled due to maintenance and repair and this feature will be recognized as important with aircraft from both economic and military considerations.

Another structure to facilitate rapid, accurate substitution of packages 10, 12 is clocked index means 56, fitting in registered receiving means 58 in the base of the packages, as shown in Figure 5. This or equivalent index means will accept like replacement packages and reject unlike packages to guard against errors in replacement. Electrical connections may be alternatively or additionally clocked. Handles 60 for handling packages 10 are shown in Figure 5.

Referring again to the graph of Figure 8, sharply diminishing returns in density ratio occurs with a package size between two and three cubic feet in a study of a group of package forms and compartment configurations. The curves of Figure 8 are averages of the group and with a particular package and compartment the density ratio curve in the region of 2-3 cubic feet will exhibit peaks and valleys responsive to coincidence between compartment contour and dimension and multiples of package height plus shelf and spacing allowances.

In general, as shown in Figure 8, density ratio increases as the package becomes smaller. A point is reached, however, where further reduction results in less density because of the increased volume of supporting structure and clearance space. This is approximately the same point where supporting structure weight rises sharply. The curves of Figure 8 are generalized for a group of various packages and compartment configurations studied and irregularities appear at the left side for a particular package and compartment. The one-quarter cubic foot size exhibits the best density ratio most consistently in plotting of particular packages and compartments and thus is selected as preferred. In package dimensions, a ratio between width-height-depth dimensions of 1:1:2 has achieved somewhat better results than others studied and is preferred and the basic envelope selected for development was 6" x 6" x 12". However, this selection is on the basis of adaptability of packages to airframe. The package shape and size must also be adapted to internal components, the bulk of which are tubes, capacitors, resistors, small transformers, relays and semiconductor devices. The dimensions 6" x 6" x 12" may not be most ideal for certain groups of components but the variance therefrom is likely to be small and within the basic concept and the figure of one quarter cubic foot capacity should not vary more than plus or minus twenty-five percent. A greater departure significantly affects density. The achieved weight ratio should be about 1:5 for this size container as indicated in the graph of Figure 8.

Most equipment of present types will fit in the basic package 10. To accommodate equipment requiring larger volume, package 12 is of double size. Other multiples of basic package 10 can be used when required and will mount on shelves 14 using the same fastening means 40—44 as demonstrated in Figure 6. A limited need might arise for a package smaller than container 10 but this can be provided on a mounting base having the width and depth of container 10. Package 12 may be slightly in excess of double the size of package 10 because small clearances, i.e., 0.10 inch for sides without members 40 and 0.55 inch with members 40, may appear between the packages for which the larger packages are substituted. This is an immaterial variance. When it is stated in the specification and claims that packages are provided that are multiples of a standard or basic package, this is defined as permitting minor variances from mathematical exactness as long as the borders of the larger package are substantially the same as the borders of the packages for which it was substituted. Packages of multiple height to the basic package should be avoided when possible because of adverse effect to density. One order of preferable package sizes would be (width-height-depth): 6 x 6 x 12; 12 x 6 x 12; 6 x 6 x 24; 12 x 6 x 24; 12 x 12 x 24; and 12 x 12 x 12. A 6 x 12 x 12 size is not included because it has the same volume as the 12 x 6 x 12 size and has the undesirable feature of increased height.

Within the indicated limits of package sizes, an important space savings is effected. Two contributing factors are (1) common shock mounting of the bank and (2) access to equipment upon pulling out the shelves eliminating required "head" space for maintenance and removal. Common shock mounting, as described hereafter, eliminates much of the sway clearance presently provided for individually shock mounted packages.

Compartment 22 is defined by panels 66, 68, 70, 72, 74 secured to structural supports 76. Telescopic supports 18 are supported in the bank by trussed side structural members 78. Structural members 78 are secured to a bank base 80 which is mounted on a sub-base 82 by means comprising resilient vibration isolators 84 and tension bolts 86.

An important feature of the bank construction is the use of the common vibration isolator 84 rather than relying on individual vibration mounting of each electronic container. Economy, simplicity and weight savings are achieved. Any particularly sensitive electronic units can have supplemental shock mounting internal of packages 12 to provide sufficient shock absorption together with shock isolators 84.

Sub-base 82 is supported by four rollers 88 which are guided by channel tracks 90 in movement toward and away from door 92. Door 82 is hingedly mounted and latch means may be used to secure it in open and closed position. Bank 16 may be replaced as a whole by a fork truck 94 as shown in Figure 1. As the shelves are removable, it may be desirable in some installation to have the bank support structure fixed, but rapid maintenance capability is provided with the removable bank. The removability of the bank together with alternative replacement of individual shelves 14 means that aircraft 96 will have a minimum time confined to the ground due to maintenance and repair of electronic components and this is an important feature of the invention. One important concept of the invention is to provide access through an exterior door and this is the preferred configuration. Present aircraft do not have much of the equipment directly accessible to the outside. Direct exterior access means that space does not have to be provided in the airframe for maintenance personnel and for clearance space for removing components.

Door 92 is shown with an abutment 98 to hold bank 16 in place when the door is locked. Other locking means may be substituted and may also be applied to the individual shelves 14 to hold them in position when the door is closed.

Telescoping track 18 may take the form as shown common to slidably mounted, detachable filing cabinet drawers. The track includes an outer track member 100 secured to structural members 78, an intermediate track member 102, and an inner track member 104 secured to shelf 14. Intermediate track member 102 has a pair of rollers 106 bearing on the inner surface of outer track member 100 and a pair of rollers 108 bearing on the outer surface of inner track member 104. Upstanding lug 110 on outer track 100 and depending lug 112 on inner track 104 provide stops preventing shelf 14 from being removed until lifting of the front edge clears at least one roller 106, 108 to pass over corresponding abutment lip 110, 112.

In this specification the terms "electrical" and "electronic" are used interchangeably in referring to the electrical circuits of various systems and equipment and when the term "electrical" is used in the claims it is used in the generic sense of electrical and/or electronic, insofar as they are different. Whereas electronic systems were once thought of being distinct and including circuits with electronic tubes, the use of transistors and other solid or liquid components in substitution of the tubes is leading to abandonment of the former distinction. The electrical systems having components thereof mounted according to our invention can serve any one of a number of functions such as navigation, bombing, radar, aircraft control.

Having thus described our invention, we do not wish to be understood as limiting ourselves to the specific details of construction shown but wish instead to cover those modifications thereof which will occur to those skilled in the art after learning our disclosure, and which fall within the scope of our invention, as described in the appended claims.

We claim:

1. In an aircraft having a fuselage, said fuselage having a series of operating electrical circuits carried thereby and serving various functions, the improvement in mounting means for a number of electrical components of said circuits in the aircraft fuselage, comprising: said fuselage having door means in an exterior side wall thereof, a bank consisting of a series of superposed shelves disposed in said fuselage and aligned with said door means and said bank having shelf support means supporting each shelf for a push-pull telescoping movement relative the other shelves from a superposed position to a supported position in front of said bank through said door means and support means for said bank permitting push-pull movement relative the fuselage from a position within the same to a position through said door means for removal and replacement of the bank, a plurality of packages detachably supported by a face of each shelf and said packages containing said electrical components, each package being a multiple of a standard package and having its width, height and depth multiples of the corresponding dimensions of the standard package, some packages being larger than said standard package, whereby larger packages and smaller packages can be interchanged in the same shelf area and the majority of said packages having the size of said standard packages, said shelves being hollow and having inlet air openings connecting with each package and each package having an outlet air opening and a source of cooling air having an air passageway conduit connected to each shelf for supplying cooling air to each package through said inlet openings, electrical lines connecting to the packages on each shelf operative in both of said positions of said shelves, said air passageway conduit and electrical lines having quick disconnect fittings for disconnecting said conduit and lines from said shelves and the packages thereon, said packages having clocked index means to prevent improper installation; and said bank being shock mounted relative the bank support means forming the principal shock mounting of the electrical components.

2. In an aircraft having a fuselage, said fuselage having a series of operating electrical circuits carried thereby and serving various functions, the improvement in mounting means for a number of electrical components of said circuits in the aircraft fuselage, comprising: said fuselage having closure means in an exterior wall thereof, a bank consisting of a plurality of superposed shelves disposed in said fuselage and aligned with said closure means and said bank having shelf support means supporting each shelf for a push-pull telescoping movement relative the other shelves from a superposed position to a supported position in front of said bank through said closure means and bank support means for said bank permitting push-pull movement relative the fuselage from a position within the same to a position through said closure means for removal and replacement of the bank, a plurality of packages detachably supported by a face of each shelf and said packages containing said electrical components, each package being a multiple of a standard package and having its width, height and depth multiples of the corresponding dimensions of the standard package, some packages being larger than said standard package, whereby larger packages and smaller packages can be interchanged in the same shelf area, said shelves having coolant passageways connecting with each package and a source of coolant having a coolant conduit connected to each shelf coolant passageways, and electrical lines connecting to the packages on each shelf.

3. The subject matter of claim 2 in which the volume of said standard package is one-quarter cubic foot plus or minus twenty-five percent.

4. The subject matter of claim 2 in which the density ratio of fuselage volume occupied by the bank and its support means to volume of said packages is no more than 2.5:1.0.

5. In an aircraft having a fuselage, said fuselage having a series of operating electrical circuits carried thereby and serving various functions, the improvement in mounting means for a number of electrical components of said circuits in said aircraft, comprising: said aircraft having closure means in an exterior wall thereof, a bank consisting of a series of superposed shelves disposed in said aircraft and aligned with said closure means and said bank having shelf support means supporting each shelf for a push-pull telescoping movement relative the other shelves from a superposed position to a supported position in front of said bank through said closure means and bank support means for said bank permitting push-pull movement relative the aircraft from a position within the same to a position through said closure means for removal and replacement of the bank, a plurality of packages detachably supported by a face of each shelf and said packages containing said electrical components, each package being a multiple of a standard package and having its width, height and depth multiples of the corresponding dimensions of the standard package, some packages being larger than said standard package, whereby larger packages and smaller packages can be interchanged in the same shelf area and electrical lines connecting to the packages on each shelf.

6. In an aircraft having a fuselage, said fuselage having a series of operating electrical circuits carried thereby and serving various functions, the improvement in mounting means for a number of electrical components of said circuits in the aircraft fuselage, comprising: a bank consisting of a series of superposed shelves disposed in said fuselage and said bank having shelf support means supporting each shelf for a push-pull telescoping movement relative the other shelves from a superposed position to a supported position in front of said bank, a plurality of packages detachably supported by a face of each shelf and said packages containing said electrical components, each package being a multiple of a standard package and having its width, height and depth multiples of the corresponding dimensions of the standard package, some packages being larger than said standard package, whereby larger packages and smaller packages can be interchanged in the same shelf area, and electrical lines connecting to the packages on each shelf.

7. The subject matter of claim 6 in which the volume of said standard package is one-quarter cubic foot plus or minus twenty-five percent and in which the density ratio of fuselage volume occupied by the bank to volume of said packages is no more than 2.5:1.0.

8. In an aircraft having a series of operating electrical circuits carried thereby and serving various functions, the improvement in mounting means for a number of electrical components of said circuits in said aircraft, comprising: said electrical components being housed in standardized packages, the majority of the packages having the size of a standard package and the remainder of the standardized packages being larger than said standard package and having their widths, heights and depths multiples of the corresponding dimensions of said standard package whereby larger packages and smaller packages can be interchanged in the same area, a series of shelves in said aircraft and said standardized packages being detachably supported by the faces of said shelves, the majority of said shelves being superposed in banks closely spaced for maximum density so that clearance room is not available for maintenance and replacement of packages and said aircraft having support means for the shelves in each bank permitting removal of the shelves outside of the superposed position for such maintenance and replacement.

9. The subject matter of claim 8 in which the volume of said standard package is one-quarter cubic foot plus or minus twenty-five percent and in which the density ratio of aircraft volume occupied by the banks to the volume of said packages in said banks is no more than 2.5:1.0.

10. The subject matter of claim 8 in which said banks are shock mounted forming the principal shock mounting for said electrical components mounted in the banks, in which there is a common cooling system for the packages in each bank, and in which said support means for said shelves are telescopic supports.

11. In an aircraft having a series of operating electrical circuits carried thereby and serving various functions, the improvement in mounting means for a number of electrical components of said circuits in said aircraft, comprising: a bank consisting of a series of superposed, flat shelves and shelf support means supporting said superposed shelves in said aircraft, a plurality of packages detachably supported by a face of each shelf and said packages containing said electrical components, some packages being larger than others, said packages all having the same height and all having one of their width and depth dimensions whole number multiples of a dimension which is standardized for said packages whereby increase of density in the bank is facilitated, the packages and shelves being closely spaced for maximum density so that clearance room is not available for maintenance and replacement of packages and said shelf support means including means permitting removal of each shelf outside of superposed position, while the remainder of the shelves are supported in superposition, for such maintenance and replacement.

12. The subject matter of claim 11 in which said bank faces and is adjacent to an exterior wall of said aircraft and said exterior wall having an access opening aligned with said bank and said shelves being removable from said superposed position only through said opening whereby space in the aircraft is conserved by not requiring access space in the aircraft for said removal of each shelf outside of superposed position for such maintenance and replacement, and closure means for said opening.

References Cited in the file of this patent
UNITED STATES PATENTS

| | | |
|---|---|---|
| 2,242,201 | Woods | May 13, 1941 |
| 2,694,537 | Reichert | Nov. 16, 1954 |